United States Patent
Bredeweg et al.

(10) Patent No.: US 10,322,669 B2
(45) Date of Patent: Jun. 18, 2019

(54) MIRROR WITH INTEGRAL LIGHT PIPE ILLUMINATION

(71) Applicant: Innotec, Corp., Zeeland, MI (US)

(72) Inventors: Luke T. Bredeweg, Byron Center, MI (US); Philip M. Reinken, Holland, MI (US)

(73) Assignee: INNOTEC, CORP., Zeeland, MI (US)

( * ) Notice: Subject to any disclaimer, the term of this patent is extended or adjusted under 35 U.S.C. 154(b) by 28 days.

(21) Appl. No.: 15/579,346

(22) PCT Filed: May 20, 2016

(86) PCT No.: PCT/US2016/033481
§ 371 (c)(1),
(2) Date: Dec. 4, 2017

(87) PCT Pub. No.: WO2016/200582
PCT Pub. Date: Dec. 15, 2016

(65) Prior Publication Data
US 2018/0162269 A1    Jun. 14, 2018

Related U.S. Application Data

(60) Provisional application No. 62/174,048, filed on Jun. 11, 2015.

(51) Int. Cl.
*B60J 3/02* (2006.01)
*B60Q 3/64* (2017.01)
(Continued)

(52) U.S. Cl.
CPC .............. *B60Q 3/64* (2017.02); *A45D 42/10* (2013.01); *B60J 3/0282* (2013.01); *B60Q 3/252* (2017.02); *F21V 33/00* (2013.01); *G02B 6/0036* (2013.01); *G02B 6/0028* (2013.01); *G02B 6/0031* (2013.01); *G02B 6/0065* (2013.01); *G02B 6/0086* (2013.01)

(58) Field of Classification Search
CPC ..... B60J 3/0282; B60J 3/0217; B60Q 1/2665; B60Q 3/20
USPC ................ 362/549–549, 551–582, 600–634, 362/459–549
See application file for complete search history.

(56) References Cited

U.S. PATENT DOCUMENTS 4,000,404 A   12/1976 Marcus
6,366,270 B1   4/2002 Evanicky
(Continued)

FOREIGN PATENT DOCUMENTS

WO         2014123939         8/2014

OTHER PUBLICATIONS

International Search Report and Written Opinion from PCT/US2016/033481 dated Aug. 23, 2016.

*Primary Examiner* — William J Carter
(74) *Attorney, Agent, or Firm* — Warner Norcross and Judd LLP (57) ABSTRACT

A vehicle vanity visor assembly including an illuminated mirror. The assembly includes a component including a mirror portion and a light pipe portion, with the two portions separated by an air gap. The component may be a single piece of mirror stock. The light pipe portion includes one or more corners extending around the mirror portion, and the light pipe portion defines air gaps in the corner to assist in guiding light through the corners.

11 Claims, 6 Drawing Sheets

(51) Int. Cl.
*B60Q 3/252* (2017.01)
*A45D 42/10* (2006.01)
*F21V 33/00* (2006.01)
*F21V 8/00* (2006.01)

(56) References Cited

U.S. PATENT DOCUMENTS

| | | | |
|---|---|---|---|
| 6,499,868 B1 * | 12/2002 | Kerul, Jr. | B60J 3/0282 |
| | | | 362/492 |
| 8,287,164 B2 | 10/2012 | Fehn et al. | |
| 2013/0272021 A1 * | 10/2013 | Kirino | F21V 33/008 |
| | | | 362/605 |

* cited by examiner

MIRROR WITH INTEGRAL LIGHT PIPE ILLUMINATION

BACKGROUND OF THE INVENTION

The present invention relates to lighted mirrors, and more particularly to lighted vanity mirrors for vehicle visors.

Lighted mirrors are known and are used, for example, in vehicle vanity visors. An example of such a visor with a lighted mirror may be seen in PCT Patent Publication WO 2014/123939 dated Aug. 14, 2014 and entitled "Vehicle Visor Vanity Light and Actuator Assembly." This visor includes a visor housing, a mirror within the housing, and a lighting assembly for illuminating the face of one looking into the mirror. While this visor is a distinct advancement in the art, there exists a seemingly never ending goal of reducing the complexity and the thickness of the lighted mirror, and of improving the lighting.

SUMMARY OF THE INVENTION

The present invention provides a lighted mirror of reduced complexity and reduced thickness, and further providing improved performance. The lighted mirror is particularly well adapted for use in vehicle vanity visors and other applications having a relatively compact physical envelope.

More particularly, the lighted mirror includes a mirror/light pipe component and a light engine. The component includes a mirror portion and a light pipe portion. The light pipe portion includes at least one inlet and at least one outlet. The light engine directs light into the light inlet(s). The component may be, for example, mirror stock. An air gap is defined by the component to separate the mirror portion from the light pipe portion. The air gap prevents light from undesirably exiting the light pipe portion and entering the mirror portion.

In the current embodiment, the light pipe portion includes one or more corners extending about the mirror portion. The corner(s) defines second air gaps adapted to direct or guide light through the corner(s).

These and other advantages and features of the invention will be more fully understood and appreciated by reference to the description of the current embodiments and the drawings.

DESCRIPTION OF THE CURRENT EMBODIMENTS

I. Structure

Figure 1:
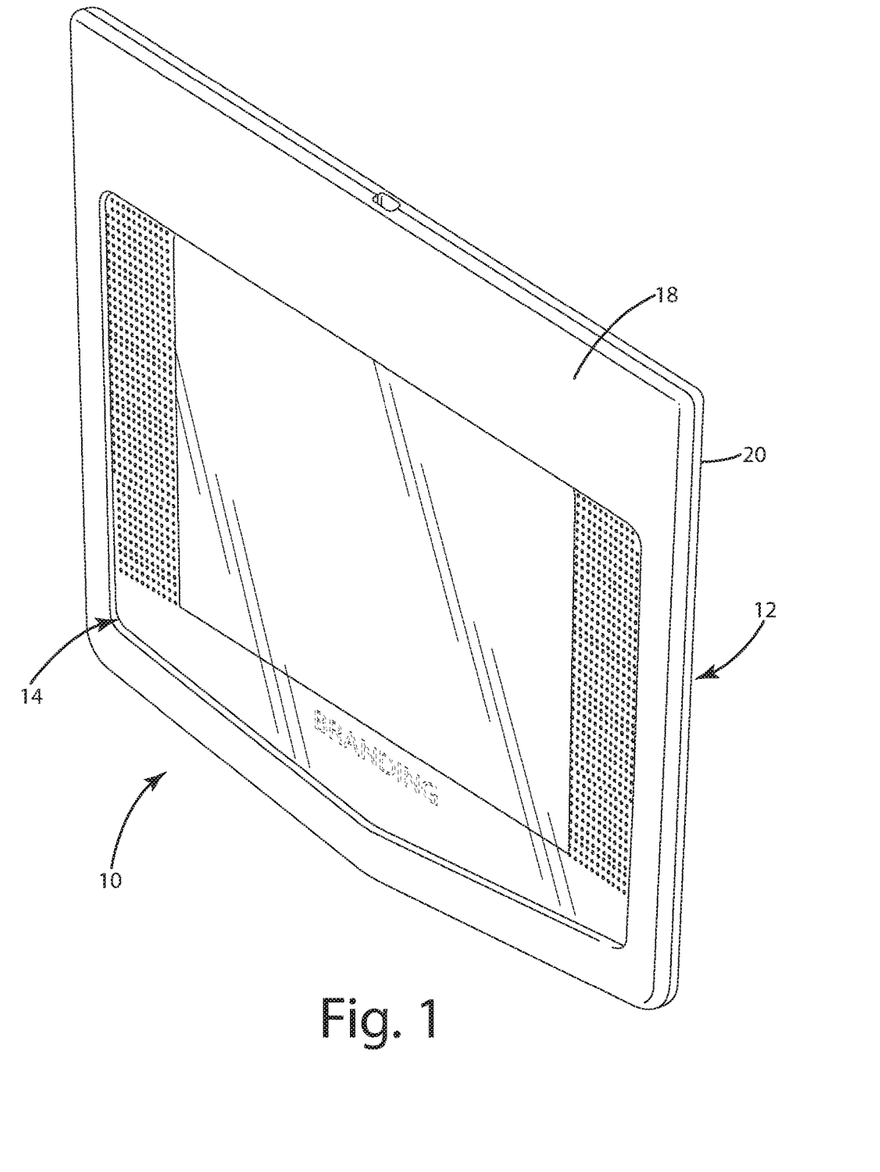
FIG. 1 is a front perspective view of a vehicle vanity visor of the present invention.
Figure 2:
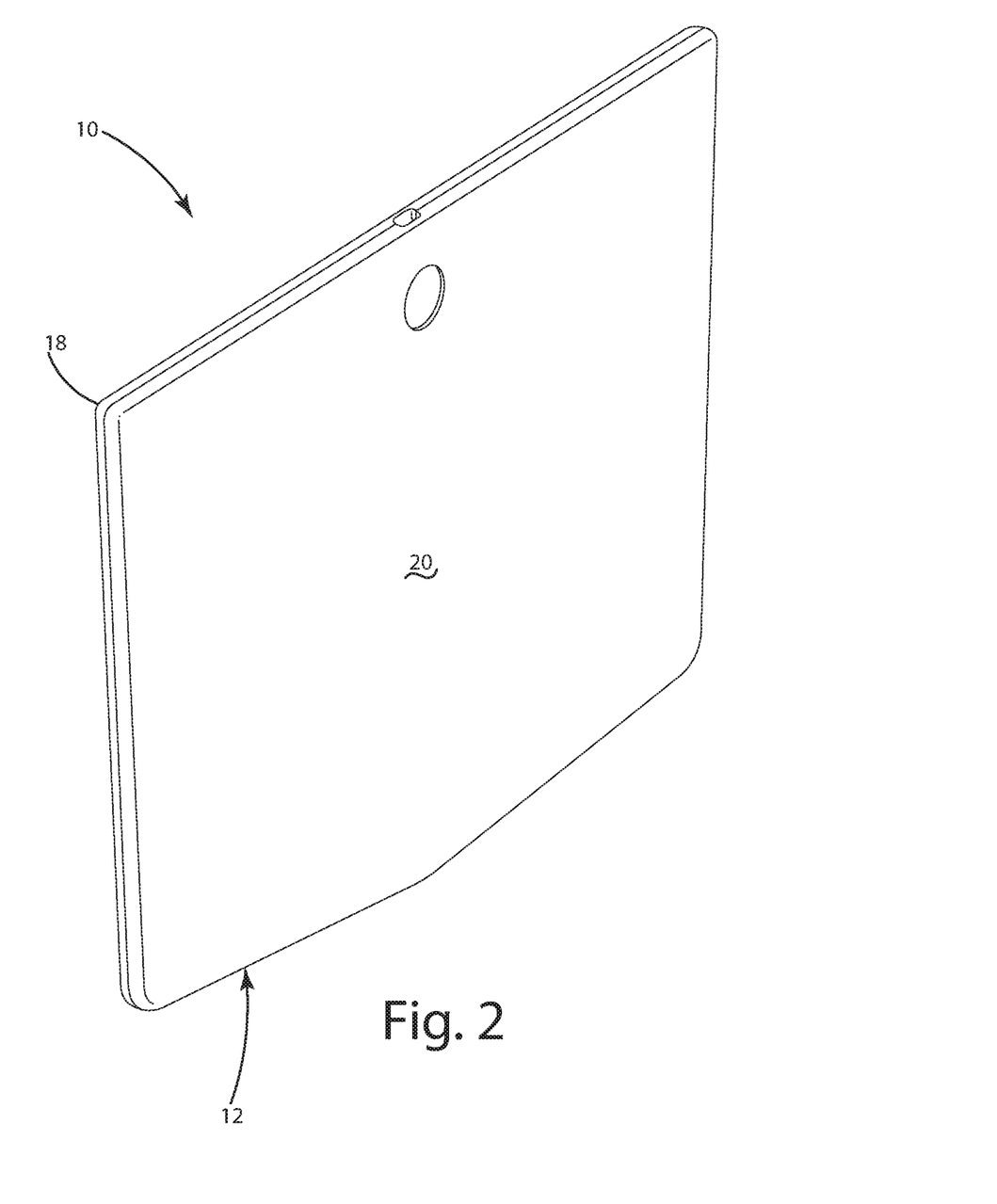
FIG. 2 is a rear perspective view of the visor.
Figure 3:
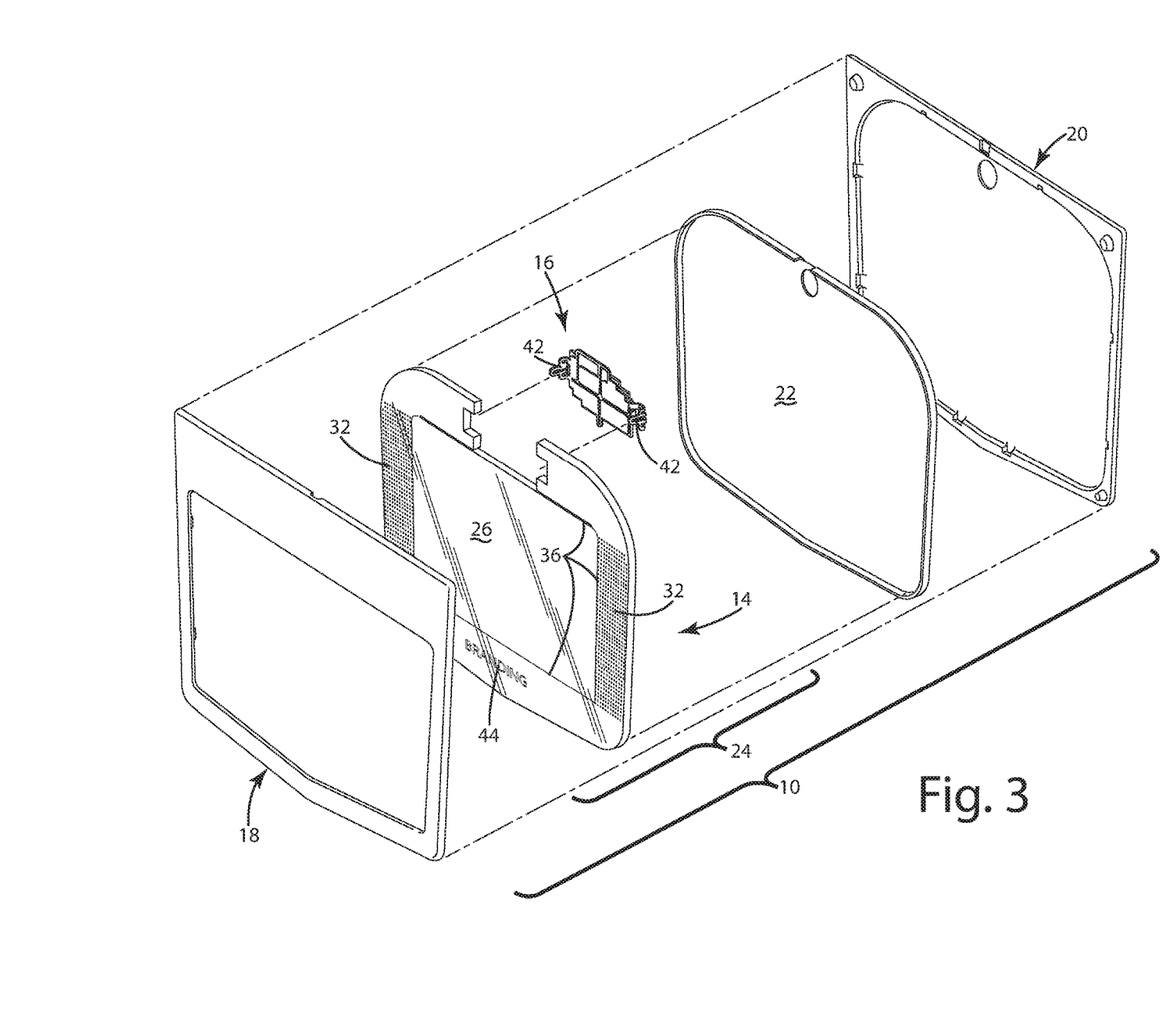
FIG. 3 is an exploded perspective view of the visor.

A vehicle vanity visor in accordance with a current embodiment of the invention is illustrated in FIGS. 1-3 and generally designated 10. The visor includes a housing 12, a light pipe/mirror component 14, and a light engine 16.

The housing 12 includes a front cover 18 and a back cover 20 fastened to one another. The housing 12 supports the component 14 and the light engine 16. The housing 12 also includes (not shown) a mirror cover and means for supporting the visor within a vehicle passenger cabin.

A tub 22 may be provided in conventional fashion. When provided, the tub 22 is preferably a white or reflective material to enhance efficiency and to preventing light leakage through the outside edges of the component 14.

With the possible exceptions of sizes and shapes, the construction and operation of the housing 12 and the tub 22 are conventional and will be readily understood by those skilled in the art. Hence, a more detailed description is neither necessary nor provided.

The mirror/light pipe component 14 and the light engine 16 together provide a lighted mirror assembly 24. While the assembly 24 is shown within the context of a vehicle vanity visor 10, the assembly has other applications as will be recognized by those skilled in the art. The assembly 24 is particularly well-suited for applications having or desiring limited physical envelopes, and in particular thin profiles.

Figure 4:
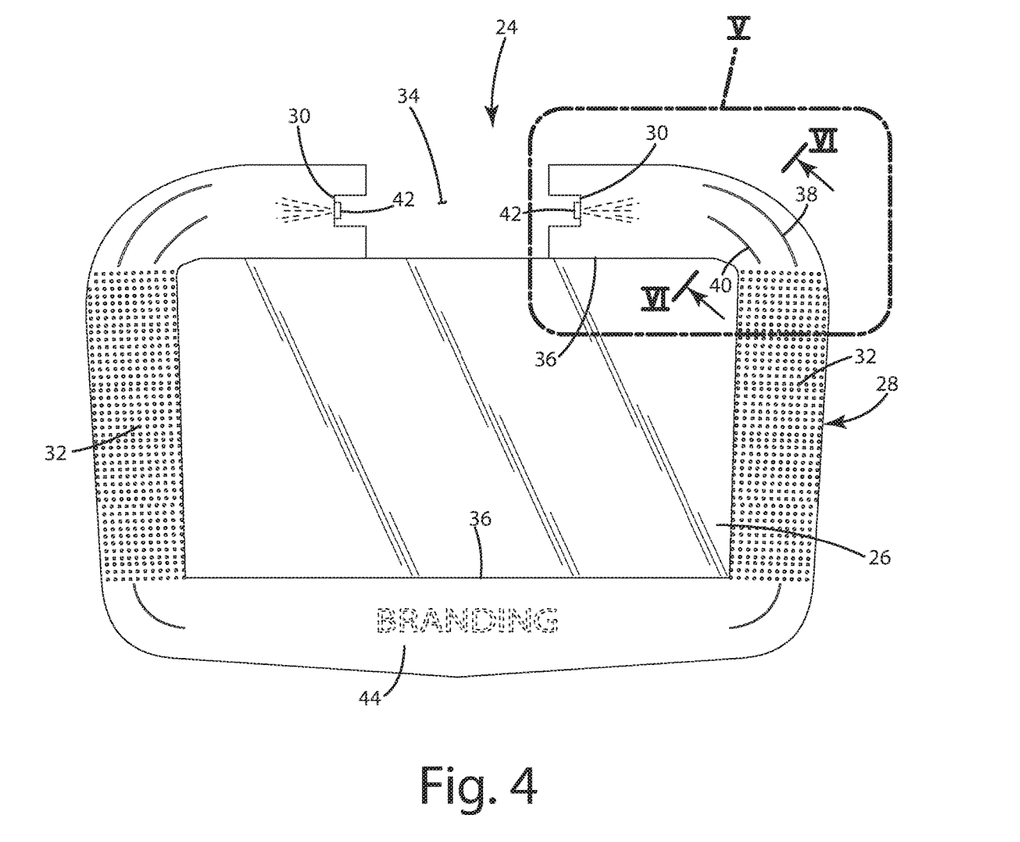
FIG. 4 is a plan view of the mirror/light pipe component.

The mirror/light pipe component 14 includes a mirror portion 26 and a light pipe portion 28. The component 14 may be any transparent material including a reflective coating on the rear surface of at least the mirror portion 26. Alternatively, the material could be translucent, although any translucent material would be less efficient than transparent material. The reflective coating may be included on the back of the light pipe portion 28 as well to enhance the efficiency of the light pipe portion. The component 14 may be, for example, a single piece of mirror stock of any suitable type known to those skilled in the art. In such case, the reflective coating would extend over the entire rear surfaces of the mirror portion 26 and the light pipe portion 28.

This specification consistently uses the term "light pipe" to refer to the portion 26. The term "light guide" could be used interchangeably with "light pipe". Light pipe in this specification is intended to include any device designed to transport light from a light source to a point at some distance from the light source with minimal, or at least modest, loss. Light is transmitted through a light pipe by means of internal reflection.

The mirror portion 26 of the current embodiment is generally rectangular. However, the mirror portion 26 may be any shape, polygonal or otherwise. When rectangular, the mirror portion 26 obviously includes four sides and four corners.

The light pipe portion 28 includes two light inlets 30 and two light outlets 32 of conventional design. The two light inlets 30 are spaced from one another to define an opening or gap 34 therebetween. The light engine 16 is positioned within the opening 34 and is described in further detail below. A lens (not shown) may be cut, molded, or otherwise formed in either or both of the light inlets 30. The light outlets 32 are integral with the light pipe portion 28. Specifically, the light outlets 32 are etched into the top surface of the light pipe portion 28. Exemplary etch patterns include dot patterns of offset rows, hatched circles, hatched boxes, lattice structures, chevron shapes, and lines of varying depth. Other etching patterns and configurations will be known to those skilled in the art.

The light pipe portion 28 extends around all four sides of the mirror portion 26. The light pipe portion 28 may extend around fewer than all four sides depending on desired performance. Preferably, the light pipe portion extends around at least two sides so that the two light outputs 32 may be on opposite sides of the mirror portion 26.

Figure 6:
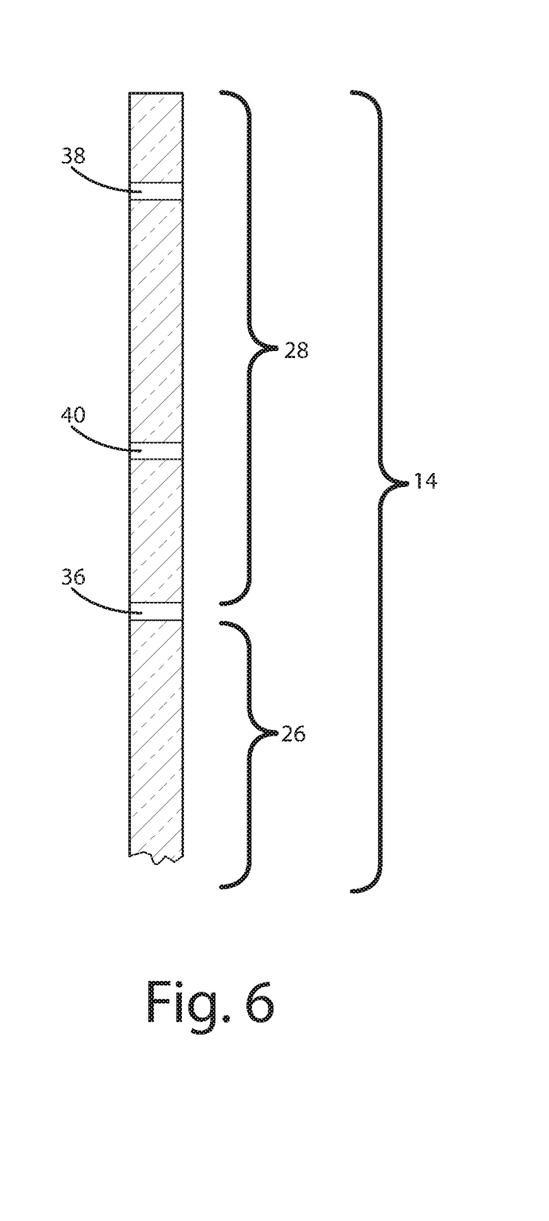
FIG. 6 is a sectional view taken along line VI-VI in FIG. 5.

The mirror/light pipe component 14 defines an air gap 36 between the mirror portion 26 and the light pipe portion 28. The air gap is a groove, channel, or other void between the two portions 26 and 28. As illustrated in FIG. 6, all or portions of the air gap 36 may extend entirely through the component 14. Alternatively, all or portions of the air gap 36 may extend partially through the component 14, in which case the air gap preferably opens through the back surface of the component 14 so that the front surface may remain uninterrupted.

The air gap 36 may be created by any suitable means including milling operations, laser cutting operations, chemical burning, cutting, water jetting, or other operations for removing material. Alternatively, the air gaps 38 and 40 may have other shapes and/or lengths to achieve desired results. Alternatively, the component 14 may be molded in a single-shot process or a multiple-shot process, and the air gaps could be created as part of the molding process. In the case of molding, the desired mirror material or reflective coating may be printed or over-molded to generate the mirror and desired effects.

An air gap 36 that extends entirely through the component 14 is more efficient than an air gap that does not. So, there is a performance/efficiency preference for an air gap 36 that extends entirely through the component. However, it is desirable to have one or more portions of the air gap 36 extend only partially through the component 14 so that the mirror portion 26 and the light pipe portion 28 may remain physically connected. Regardless, the portions 26 and 28 are considered part of a single component and indeed parts of a one-piece component. In the current embodiment, the air gaps in the visible portion of the mirror/light component 14 extend partially through the component; and the air gaps covered by the front cover 18 extend entirely through the component. This arrangement provides a desired balance of aesthetics and performance.

The air gap 36 provides a light barrier and improves the efficiency of the light pipe portion 28. Specifically, the air gap 36 improves the refraction of light within the light pipe portion 28, and reduces the ability of light to undesirably pass out of the light pipe portion 28 and into the mirror portion 26.

Figure 5:
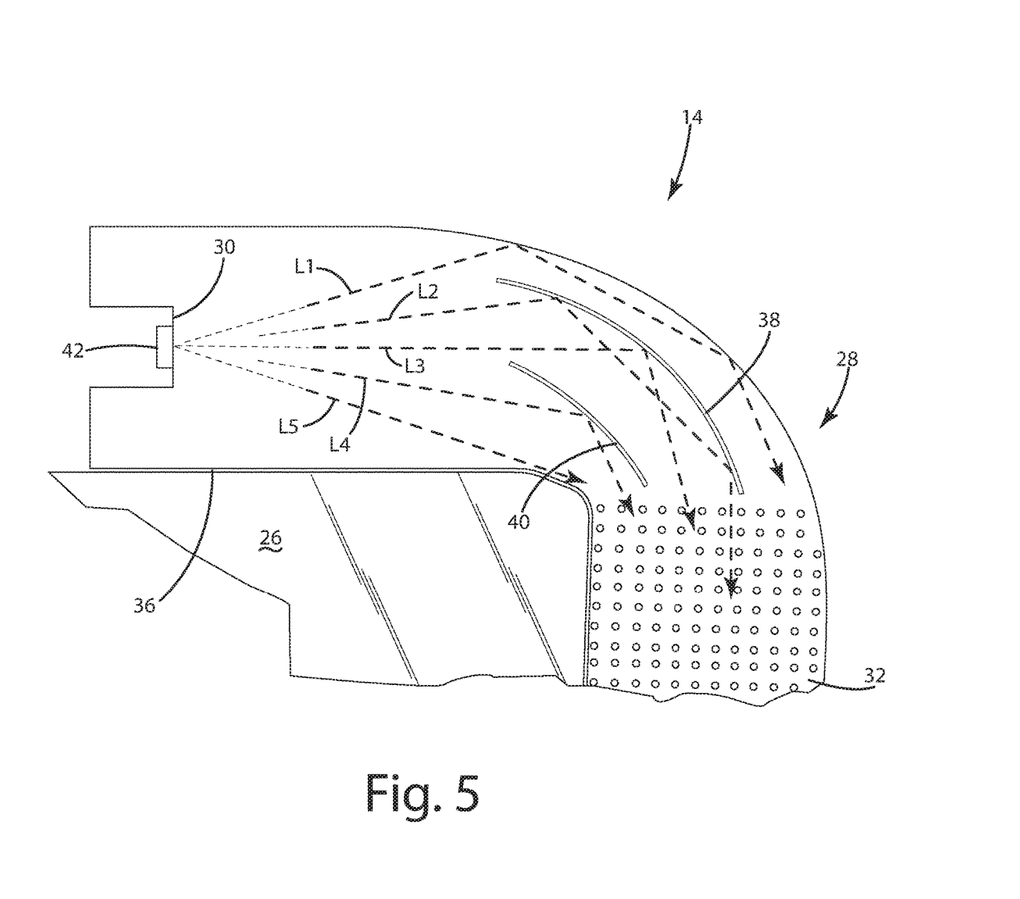
FIG. 5 is an enlarged view of the upper right-hand (as viewed in FIG. 4) corner of the mirror/light pipe component.

As perhaps best illustrated in FIG. 5, each corner of the light pipe portion 28 may include one or more additional air gaps. The corner illustrated in FIG. 5 includes two air gaps 38 and 40. As illustrated in FIG. 6, and like the air gap 36, the air gaps 38 and 40 may extend entirely through the component 14. Alternatively, and again like the air gap 36, the air gaps 38 and 40, or portions of the air gaps, may extend partially through the component 14.

The air gaps 38 and 40 may be arcuate segments having different centers. The positioning and the radii of the air gaps 38 and 40 will vary depending on how the light travels within the light pipe portion 28. Factors that may impact light performance include the angle of light from the LEDs 42, the distances of the LEDs from the corners, and the overall corner sweeping shape. Offsetting the centers of the air gaps 38 and 40 from one another may balance the light more efficiently. The shapes, lengths, and positioning of the air gaps may be shifted as desired to avoid bright or dim spots over the extent of the light outputs 32. The starting and the ending points of the air gaps 38 and 40 define the beginning of the diversion of light and the direction in which the light is directed.

One or more, or portions, of the air gaps 36, 38, and 40 may be filled with a material to further improve light blocking and guiding. The material additionally may provide a desired aesthetic effect.

Branding 44 may be etched using conventional processes or otherwise formed in the light pipe portion 28 to assist in drawing light through the branding. The branding may include trademarks, trade names, words, logos, graphics, or other visual effects.

The light engine 16 may be of conventional design including two light sources for directing the light into the two light inlets 30. In the current embodiment, the light emitters each include one or more light emitting diodes (LEDs) 42. The LEDs 42 may be bonded to the light inlets 30 to enhance efficiency. The light engine 16 may also include a source of ambient light (not shown) which shines through the back cover 20 and therefore the lower surface of the visor 10 when the visor is stored in its upper position against the headliner. Alternatively, a source of ambient light may be provided separate from the light engine 16.

While the lighted mirror assembly 24 has been described in conjunction with a vehicle vanity visor 10, it will be recognized and appreciated that the assembly has widespread applicability. For example, to name a few applications, the assembly could be incorporated into retail store displays, retail kiosks (for example for sunglasses), vehicle visors, and battery powered handheld mirrors. Other applications will be recognized by those skilled in the art.

II. Operation

As perhaps most clearly illustrated in FIG. 5, the LEDs 42 emit scattered rays of light $L_1$ through $L_5$ (collectively the light L). Without the air gaps 36, 38, and 40, the scattered light L would tend to bend or escape the light pipe portion 28 due to less than ideal angles for refracting the light back into the light pipe portion.

The air gaps 38 and 40 direct the light through the corner of the light pipe 28, and one or more air gaps in the other corners perform similarly. The air gaps 38 and 40 also assist in balancing the light before the light enters the critical areas of the light pipe and specifically the area of the light outputs 32 and branding 44 if provided. As illustrated in FIG. 5, the light rays refract in various locations throughout the corner geometry including into the air gaps 38 and 40. Because of the air gaps 38 and 40, as the light travels through the corner toward the light outlets 32, the light does so in a more balanced manner by preventing light from gathering around and/or in the corner on the outer edge of the corner.

Because the LEDs 42 face in opposite directions, light that does not exit through the outlets 32 refracts to the other side of the light pipe which enables the two light sources to diffuse together, thereby mixing the two light sources and harmonizing any dissimilarities in color or intensity between the LEDs.

When the light pipe portion 28 includes a reflective backing, for example when the component 14 is mirror stock, the backing improves the efficiency of the light pipe portion.

III. Conclusion

The above description is that of current embodiments of the invention. Various alterations and changes can be made without departing from the spirit and broader aspects of the invention as defined in the appended claims, which are to be interpreted in accordance with the principles of patent law including the doctrine of equivalents.

This disclosure should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein.

The phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "front," "back," "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. A vehicle visor assembly comprising:
a housing;
a mirror/light pipe component within the housing, the mirror/light pipe component including a mirror portion and a light pipe portion each having a rear surface, the mirror portion at least partially separated from the light pipe portion by an air gap extending at least partially through the mirror/light pipe component, the mirror-light pipe component being a single piece of mirror stock including a reflective coating extending over the rear surfaces of the mirror portion and the light pipe portion, the light pipe portion including a light inlet and a light outlet; and a light engine adapted to direct light into the light inlet.

2. A vehicle visor assembly as defined in claim 1 wherein:
the light pipe portion includes a corner between the light inlet and the light outlet; and
the light pipe portion defines a second air gap in the corner adapted to guide light through the corner.

3. A vehicle visor assembly as defined in claim 2 wherein at least a portion of the air gaps is filled with a material.

4. A vehicle visor assembly as defined in claim 1 wherein:
the mirror portion is rectangular;
the light pipe portion extends along at least two sides of the rectangular mirror portion; and
the light pipe portion includes two light outlets on opposite sides of the mirror portion.

5. A vehicle visor assembly comprising:
a housing;
a mirror/light pipe component within the housing, the mirror/light pipe component being a single piece of mirror stock, the mirror/light pipe component including a mirror portion and each having a rear surface, the single piece of mirror stock including a reflective coating extending over the rear surface of the mirror portion and the light pipe portion a light pipe portion, the mirror/light pipe component defining a first air gap between the mirror portion and the light pipe portion, the light pipe portion including a corner, the component defining a second air gap in the corner, the light pipe portion including a light inlet and a light output on opposite sides of the corner; and
a light engine adapted to direct light into the light inlet.

6. A vehicle visor assembly as defined in claim 5 wherein at least a portion of the first and second air gaps is filled with a material.

7. A vehicle visor assembly as defined in claim 5 wherein:
the mirror portion is rectangular;
the light pipe portion extends along at least two sides of the rectangular mirror portion; and
the light pipe portion includes two light outlets on opposite sides of the mirror portion.

8. An illuminated mirror comprising:
a component defining a mirror portion and a light pipe portion each having a rear surface, the component being a single piece of mirror stock including a reflective coating extending over the rear surfaces of the mirror portion and the light pipe portion, the component defining an air gap between the mirror portion and the light pipe portion, the light pipe portion including a light inlet and a light outlet; and
a light source adapted to direct light into the light inlet.

9. An illuminated mirror as defined in claim 8 wherein:
the light pipe portion includes a corner between the light inlet and the light outlet; and
the light pipe portion defines a second air gap in the corner adapted to guide light through the corner.

10. An illuminated mirror as defined in claim 9 wherein at least a portion of the first and second air gaps is filled with a material.

11. An illuminated mirror as defined in claim 9 wherein:
the mirror portion is rectangular;
the light pipe portion extends along at least two sides of the rectangular mirror portion; and
the light pipe portion includes two light outlets on opposite sides of the mirror portion.

* * * * *